United States Patent
Xiao et al.

(10) Patent No.: US 12,002,080 B2
(45) Date of Patent: *Jun. 4, 2024

(54) SYSTEMS AND METHODS FOR CHECKING AND CONFIRMING THE PURCHASE OF MERCHANDISE ITEMS

(71) Applicant: Walmart Apollo, LLC, Bentonville, AR (US)

(72) Inventors: Zhichun Xiao, Plano, TX (US); Lingfeng Zhang, Dallas, TX (US); Yao Liu, Richardson, TX (US); Jon Hammer, Frisco, TX (US); Yutao Tang, Allen, TX (US); Sicong Fang, Dallas, TX (US); Haining Liu, Dallas, TX (US); Yijing Sun, Dallas, TX (US); Mingquan Yuan, Flower Mound, TX (US); Shouyi Zhang, Dallas, TX (US); Pingjian Yu, Plano, TX (US); Ryan B. Reagan, Forth Worth, TX (US); Tianyi Mao, Dallas, TX (US); Shangeetha Ravichandran Susseelaa, Dallas, TX (US); Zhenyu Wang, Dallas, TX (US); Feiyun Zhu, Allen, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/775,414

(22) PCT Filed: Nov. 12, 2020

(86) PCT No.: PCT/US2020/060120
§ 371 (c)(1),
(2) Date: May 9, 2022

(87) PCT Pub. No.: WO2021/097019
PCT Pub. Date: May 20, 2021

(65) Prior Publication Data
US 2022/0383383 A1 Dec. 1, 2022

Related U.S. Application Data

(60) Provisional application No. 62/934,056, filed on Nov. 12, 2019.

(51) Int. Cl.
*G06Q 30/0601* (2023.01)
*G06Q 20/20* (2012.01)

(52) U.S. Cl.
CPC ....... *G06Q 30/0629* (2013.01); *G06Q 20/209* (2013.01); *G06Q 30/0633* (2013.01)

(58) Field of Classification Search
CPC ............. G06Q 30/0629; G06Q 20/209; G06Q 30/0633; G06Q 20/045; G06Q 20/0457;
(Continued)

(56) References Cited

U.S. PATENT DOCUMENTS 5,804,807 A * 9/1998 Murrah ................ G06Q 20/343
235/383
6,598,791 B2 * 7/2003 Bellis, Jr. ............. G07G 1/0054
235/462.14
(Continued)

FOREIGN PATENT DOCUMENTS

CA 2868192 A1 9/2013
CN 104217324 A 12/2014
(Continued)

OTHER PUBLICATIONS

PCT; App No. PCT/US2020/60120; International Search Report and Written Opinion dated Mar. 21, 2021; (13 pages).

*Primary Examiner* — Michael Jared Walker
(74) *Attorney, Agent, or Firm* — Foley IP Law, PLLC

(57) ABSTRACT

There are provided systems and methods relating to checking and confirming merchandise purchased at shopping
(Continued)

facilities. In one form, the system includes: a shopping cart containing merchandise items to be purchased; a sales transaction database; a point-of-sales system that creates transaction records identified by transaction identifiers; and a mobile device used by an employee that includes a sensor to scan a paper or digital receipt to obtain the transaction identifier and a camera to capture images of the items in the shopping cart. The system also includes a control circuit that receives the transaction identifier, accesses the database using the identifier to determine the purchased items; analyzes the images of the merchandise items in the shopping cart and creates a computer vision receipt listing detected items; compares the purchased items with the detected items; and takes an action if there is a discrepancy.

17 Claims, 9 Drawing Sheets

(58) Field of Classification Search
CPC .... G06Q 20/047; G06Q 20/18; G06Q 20/202; G06Q 20/208; G06Q 20/322; G06Q 20/3267; G06Q 20/3276; G06Q 20/389; G06Q 30/06; G06N 3/045; G07G 1/0063; G07G 3/003
See application file for complete search history.

(56) References Cited

U.S. PATENT DOCUMENTS

| | | | | |
|---|---|---|---|---|
| 7,114,656 B1* | 10/2006 | Garver | | G06Q 20/20 235/462.46 |
| 7,219,838 B2* | 5/2007 | Brewster | | A47F 9/045 235/382 |
| 7,780,081 B1* | 8/2010 | Liang | | G06Q 30/0633 235/383 |
| 8,196,822 B2* | 6/2012 | Goncalves | | G07G 1/0072 235/462.14 |
| 8,448,859 B2* | 5/2013 | Goncalves | | G07G 1/0054 235/383 |
| 8,620,755 B1* | 12/2013 | Argue | | G06Q 20/047 705/64 |
| 8,635,112 B1* | 1/2014 | Argue | | G06Q 20/047 705/40 |
| 8,746,557 B2* | 6/2014 | Connell, II | | G07G 1/0063 235/383 |
| 8,942,996 B2* | 1/2015 | Argue | | G06Q 20/3227 705/16 |
| 9,171,442 B2* | 10/2015 | Clements | | G08B 13/248 |
| 9,262,781 B2* | 2/2016 | MacKinnon Keith | | G06Q 20/20 |
| 9,311,645 B2* | 4/2016 | Edwards | | G06Q 30/018 |
| 9,552,710 B2* | 1/2017 | Rasband | | G08B 13/2454 |
| 9,892,438 B1* | 2/2018 | Kundu | | G06Q 30/0609 |
| 9,911,138 B2* | 3/2018 | Grabovski | | G06Q 20/387 |
| 10,592,944 B2* | 3/2020 | Kundu | | G07G 1/0036 |
| 2005/0189411 A1* | 9/2005 | Ostrowski | | G07G 3/00 235/383 |
| 2006/0032914 A1* | 2/2006 | Brewster | | A47F 9/045 235/383 |
| 2007/0080220 A1 | 4/2007 | Garver | | |
| 2010/0053329 A1* | 3/2010 | Flickner | | G06Q 30/0603 340/568.1 |
| 2012/0041845 A1* | 2/2012 | Rothschild | | G06Q 20/20 705/26.81 |
| 2012/0095853 A1* | 4/2012 | Von Bose | | G06Q 20/20 705/16 |
| 2012/0173351 A1* | 7/2012 | Hanson | | G06Q 30/0635 705/26.81 |
| 2012/0320214 A1* | 12/2012 | Kundu | | G06Q 30/06 348/150 |
| 2013/0018741 A1* | 1/2013 | Ostrowski | | G07G 1/0036 705/23 |
| 2014/0067568 A1* | 3/2014 | Argue | | G06Q 10/08 705/28 |
| 2014/0211017 A1* | 7/2014 | Argue | | G07G 3/003 348/150 |
| 2014/0214596 A1* | 7/2014 | Acker, Jr. | | G06Q 30/0633 705/26.8 |
| 2014/0316901 A1* | 10/2014 | Grabovski | | G06Q 30/0268 705/14.65 |
| 2017/0046707 A1* | 2/2017 | Krause | | G07G 1/14 |
| 2017/0161703 A1* | 6/2017 | Dodia | | G07G 1/0072 |
| 2017/0323253 A1* | 11/2017 | Enssle | | G06Q 10/087 |
| 2018/0232796 A1* | 8/2018 | Glaser | | G06Q 40/12 |
| 2019/0034897 A1* | 1/2019 | Gao | | G07G 1/0081 |
| 2019/0043057 A1* | 2/2019 | Montgomery | | G06Q 20/4018 |
| 2019/0080277 A1* | 3/2019 | Trivelpiece | | G06N 20/00 |
| 2019/0355049 A1* | 11/2019 | Kulkarni Wadhonkar | | G06Q 20/12 |
| 2021/0019725 A1 | 1/2021 | Xiao | | |

FOREIGN PATENT DOCUMENTS

| | | | |
|---|---|---|---|
| CN | 207731310 U | 8/2018 | |
| WO | 2015051303 A1 | 4/2015 | |
| WO | WO-2015051303 A1 * | 4/2015 | ....... G06K 19/06037 |
| WO | 2019062018 A1 | 4/2019 | |
| WO | 2021097019 A1 | 5/2021 | |

* cited by examiner

SYSTEMS AND METHODS FOR CHECKING AND CONFIRMING THE PURCHASE OF MERCHANDISE ITEMS

CROSS-REFERENCE TO RELATED APPLICATION

This application is a U.S. national stage application of International Application No. PCT/US2020/060120, filed Nov. 12, 2020, designating the United States, which claims the benefit of U.S. Provisional Application No. 62/934,056, filed Nov. 12, 2019, which is incorporated by reference in its entirety herein.

TECHNICAL FIELD

This invention relates generally to checking and confirming the purchase of merchandise items, and more particularly, generally to checking and confirming the purchase of merchandise items in shopping carts at shopping facilities.

BACKGROUND

In the retail setting, stores are constantly seeking to check and confirm the purchase of all merchandise items as a customer is leaving the store. For example, stores are seeking to confirm that all of the merchandise items in a shopping cart were actually accounted for and registered at a point-of-sale system. In other words, stores seek to address the issue of "shrinkage," where a customer or cashier may have failed to account (intentionally or unintentionally) for one or more of the merchandise items being purchased.

Further, there is a need for an approach that addresses all of the various point-of-sale or checkout options. For example, purchases may be carried out via self-checkout by the customer at self-checkout registers, checkout by a store cashier at a cashier station, or checkout through a customer's own mobile device where the customer scans each item being purchased. Accordingly, there is a need to check and confirm the purchase of merchandise items, regardless of how the purchase transaction is handled.

BRIEF DESCRIPTION OF THE DRAWINGS

Disclosed herein are embodiments of systems, apparatuses and methods for checking and confirming the purchase of merchandise at shopping facilities. This description includes drawings, wherein.

Figure 1:
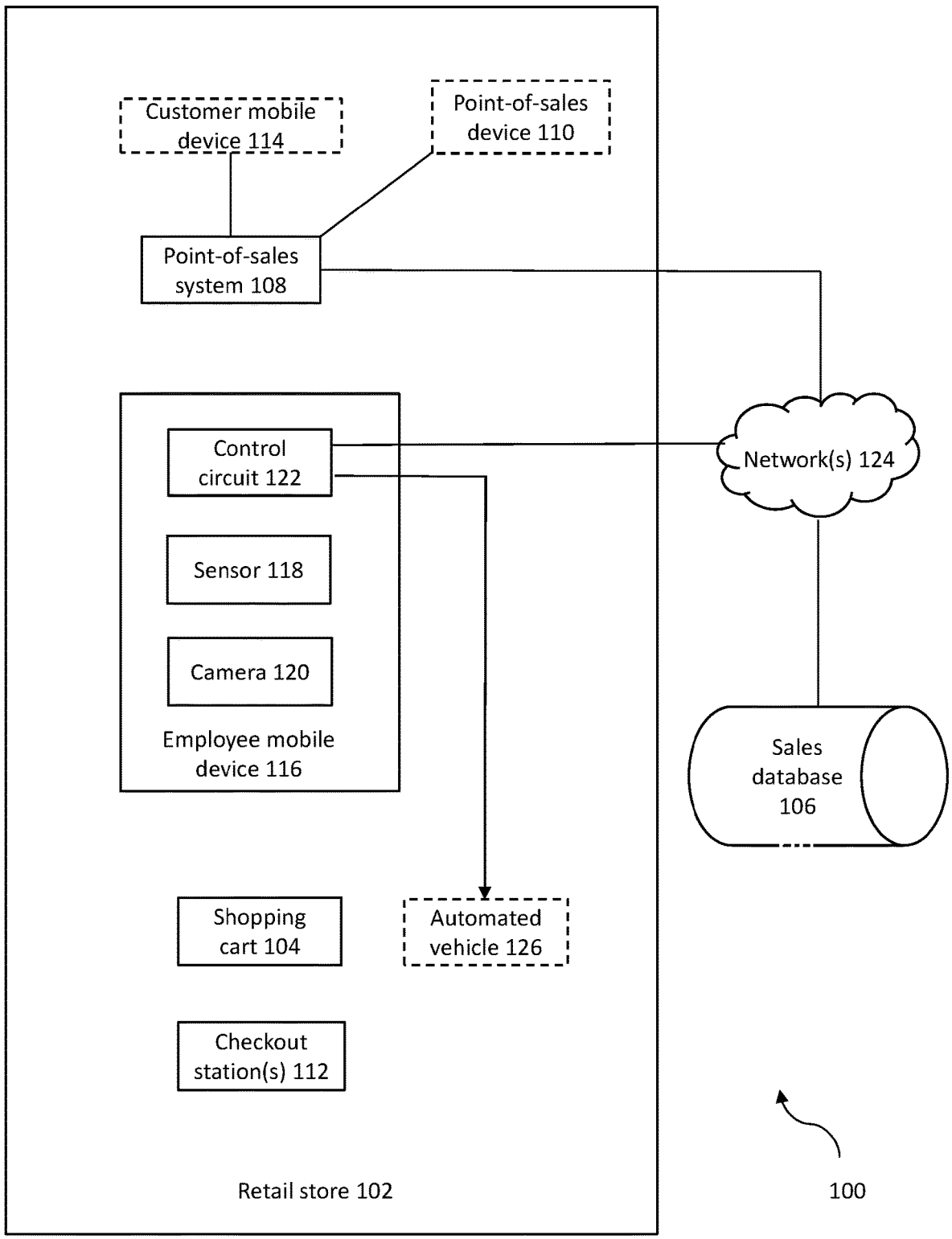
FIG. 1 is a block diagram in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one form," "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification do not all refer to the same embodiment.

Generally speaking, pursuant to various embodiments, systems, apparatuses and methods are provided herein for checking and confirming the purchase of merchandise at shopping facilities. In one form, the system includes: a shopping cart containing a plurality of merchandise items that are to be purchased by a customer at a shopping facility; a sales transaction database configured for the storage of electronic transaction records involving the sales of one or more merchandise items at the shopping facility; a point-of-sales system that records a sales transaction of a customer as the customer purchases the merchandise items in the shopping cart at the shopping facility and obtains a transaction identifier, wherein the customer obtains a paper or digital receipt of the transaction including the transaction identifier, the point-of-sales system creating an electronic transaction record identified by the transaction identifier, the electronic transaction record being stored in the sales transaction database; and a mobile electronics device that is used by an employee of the shopping facility, the employee stationed at or near an exit of the shopping facility, the mobile electronics device comprising: an electronic sensor that is configured to electronically scan the paper or digital receipt to obtain the transaction identifier; and a camera configured to capture one or more images of the merchandise items in the shopping cart. The system also includes a control circuit configured to: receive the transaction identifier from the electronic sensor; access the sales transaction database using the transaction identifier to determine the purchased merchandise items; analyze the one or more images of the merchandise items in the shopping cart using computer vision algorithms and create a computer vision receipt listing detected merchandise items from the one or more images; and compare the purchased merchandise items indicated by the transaction identifier on the paper or digital receipt with the detected merchandise items from the computer vision receipt, and when there is a discrepancy, determine an action to take; wherein the action is taken and the action is one or more of: activating an electronic alert, displaying electronic information on the mobile electronics device showing the discrepancy, activating a warning indicator on the mobile electronics device, or transmitting a control signal to instruct an automated vehicle to retrieve an unpaid merchandise item.

In some implementations, the information showing the discrepancy includes one or more of a list of unpaid items or images of unpaid items. In some implementations, the control circuit analyzes the one or more images using one or more convolutional neural networks (CNNs). In some implementations, the system further comprises one or more checkout stations in the shopping facility, the one or more checkout stations configured for at least one of checkout by a cashier and self-checkout by the customer, the point-of-sales system comprising a point-of-sales device being located at the one or more checkout stations. In some implementations, the system further comprises a mobile electronics device of the customer used to purchase the merchandise items and configured to display a digital receipt at the mobile electronics device following purchase of the merchandise items. In some implementations, the system further comprises an application provided by a retailer and downloaded by the customer to the customer's mobile electronics device for purchase of merchandise at shopping facilities using the customer's mobile electronics device. In some implementations, the automated vehicle is an aerial drone or an automated ground vehicle. In some implementations, the transaction identifier comprises a barcode or a QR code.

In another form, there is provided a method for checking and confirming the purchase of merchandise at shopping facilities, the method including: providing a shopping cart, the shopping cart containing a plurality of merchandise items that are to be purchased by a customer at a shopping facility; providing a sales transaction database configured for the storage of electronic transaction records involving the sales of one or more merchandise items at the shopping facility; providing a point-of-sales system that records a sales transaction of a customer as the customer purchases the merchandise items in the shopping cart at the shopping facility and obtains a transaction identifier, wherein the customer obtains a paper or digital receipt of the transaction including the transaction identifier, the point-of-sales system creating an electronic transaction record identified by the transaction identifier, the electronic transaction record being stored in the sales transaction database; and providing a mobile electronics device that is used by an employee of the shopping facility, the employee stationed at or near an exit of the shopping facility, the mobile electronics device including an electronic sensor that is configured to electronically scan the paper or digital receipt to obtain the transaction identifier and a camera configured to capture one or more images of the merchandise items in the shopping cart. The method further includes, by a control circuit at the mobile electronics device of the employee: receiving the transaction identifier from the electronic sensor; accessing the sales transaction database using the transaction identifier to determine the purchased merchandise items; analyzing the one or more images of the merchandise items in the shopping cart using computer vision algorithms and create a computer vision receipt listing detected merchandise items from the one or more images; and comparing the purchased merchandise items indicated by the transaction identifier on the paper or digital receipt with the detected merchandise items from the computer vision receipt, and when there is a discrepancy, determine an action to take; wherein the action is taken and the action is one or more of: activating an electronic alert, displaying electronic information on the mobile electronics device showing the discrepancy, activating a warning indicator on the mobile electronics device, or transmitting a control signal to instruct an automated vehicle to retrieve an unpaid merchandise item.

In another form, there is provided a system for checking and confirming the purchase of merchandise at shopping facilities, the system including: a shopping cart containing a plurality of merchandise items that are to be purchased by a customer at a shopping facility; a sales transaction database configured for the storage of electronic transaction records involving the sales of one or more merchandise items at the shopping facility; a point-of-sales system that records a sales transaction of a customer as the customer purchases the merchandise items in the shopping cart at the shopping facility and obtains a transaction identifier, wherein the customer obtains a paper or digital receipt of the transaction including the transaction identifier, the point-of-sales system creating an electronic transaction record identified by the transaction identifier, the electronic transaction record being stored in the sales transaction database; and a mobile electronics device that is used by an employee of the shopping facility, the employee stationed at or near an exit of the shopping facility, the mobile electronics device comprising: an electronic sensor that is configured to electronically scan the paper or digital receipt to obtain the transaction identifier; and a camera configured to capture one or more images of the merchandise items in the shopping cart. The system also includes a local control circuit configured to: receive the transaction identifier from the electronic sensor; analyze the one or more images of the merchandise items in the shopping cart using computer vision algorithms and create a computer vision receipt listing detected merchandise items from the one or more images; and transmit the transaction identifier and the CV receipt. The system further includes a central control circuit configured to: access the sales transaction database using the transaction identifier to determine the purchased merchandise items; and compare the purchased merchandise items indicated by the transaction identifier on the paper or digital receipt with the detected merchandise items from the computer vision receipt, and when there is a discrepancy, determine an action to take; wherein the action is taken and the action is one or more of: activating an electronic alert, transmitting electronic information to the mobile electronics device showing the discrepancy, activating a warning indicator, or transmitting a control signal to instruct an automated vehicle to retrieve an unpaid merchandise item.

This disclosure is directed generally to a real time approach for checking and confirming the purchase of all merchandise items as a customer is leaving a store. This approach is intended to address the issue of "shrinkage," where a customer or cashier may have failed to account for one or more of the merchandise items. The approach would cover most (if not all) purchase transactions, including checkout at a store cashier, self-checkout by the customer at self-checkout registers, or self-checkout through a customer's own mobile device. In one preferred form, an employee at or near the store exit uses the camera of his mobile device to capture image(s) of the various merchandise items in the customer's cart. The employee may take a short video of each cart at or near the exit door and may also scan the barcode/identifier associated with the purchase receipt. In this form, computer vision (CV) recognizes the merchandise items from the images/video and creates a list of detected items from the images/video (CV receipt). The employee's mobile device may transmit the barcode/identifier on the paper receipt and the CV receipt to a backend system/computing circuit. In this form, the system retrieves the customer's e-receipt based on the barcode/identifier, compares the purchased items listed on the e-receipt to the detected items from the CV receipt, and displays on the employee's mobile device any merchandise items that are on the CV receipt but that were not included in the e-receipt.

Referring to FIG. 1, there is shown a system 100 for checking and confirming the purchase of merchandise at shopping facilities. The system 100 includes a shopping facility 102 that sells various types of merchandise. It is generally contemplated that the shopping facility 102 may be any of various types of facilities at which merchandise is located and that may involve the sale of merchandise. FIG. 1 shows one example of a shopping facility 102 in the form of a retail store.

The system 100 includes a shopping cart 104 containing a plurality of merchandise items that are to be purchased by a customer at the shopping facility 102. The language "shopping cart" generally refers broadly to any sort of container used by the customer to store merchandise items that have been purchased at the shopping facility 102. It is generally contemplated that the merchandise items in the shopping cart 104 are checked/imaged near the exit of the shopping facility 102 to confirm that they those items are on the list of purchased items from a purchase receipt.

The system 100 also includes a sales transaction database 106 for the storage of electronic transaction records involving the sales of one or more merchandise items at the shopping facility 102. It is generally contemplated that the sales transaction database 106 stores an electronic transactions record corresponding to each sales transaction identifying the items purchased in the transaction. In other words, after each customer completes a sales transaction, the purchase merchandise items are stored in the sales transaction database 106.

The system further includes a point-of-sales system 108 that records a sales transaction of a customer as the customer purchases the merchandise items in the shopping cart 104 at the shopping facility 102 and obtains a transaction identifier. More specifically, the customer obtains a paper or digital receipt of the transaction including the transaction identifier, and the point-of-sales system 108 creates an electronic transaction record identified by the transaction identifier. For example, the transaction identifier may be in the form of a barcode or a QR code, although alphanumeric strings and other types of scannable/readable codes and identifiers are also possible. Additional transaction information may also be collected, including, for example, the time of the transaction (such as a timestamp). The electronic transaction record is stored in the sales transaction database 106.

It is generally contemplated that the sales transaction may be processed in, at least, three different ways. First, the sales transaction may be processed through a point-of-sales device 110 at a checkout station 112 via a store cashier. Second, the sales transaction may be processed at a checkout station 112 by the customer himself, i.e., by self-checkout. In other words, the system 100 may include one or more checkout stations 112 in the shopping facility 102, and the checkout station(s) 112 are configured for checkout by a cashier and/or for self-checkout by the customer. In this form, the point-of-sales system 108 includes a point-of-sales device 110 that is located at the checkout station(s) 112. In these instances, it is generally contemplated an electronic record of the transaction is created and stored in the sales transaction database 106 and that a paper receipt or a digital receipt is generated.

In another form, it is contemplated that the customer may use his or her mobile device 114 to initiate processing of the sales transaction. In this form, the system 100 may further include a mobile electronics device 114 (or mobile device) of the customer that is used to purchase the merchandise items and to display a digital receipt at the mobile electronics device 114 following purchase of the merchandise items. In other words, the customer may use his or her mobile device 114 to purchase merchandise items without going through a checkout station 112. This purchase option via a mobile device 114 may be facilitated by an application (or "app") provided by the retailer. So, in one form, the system 100 may include an application provided by a retailer and downloaded by the customer to the customer's mobile electronics device 114 for purchase of merchandise at shopping facilities 102 using the customer's mobile electronics device 114. It is generally contemplated that this application facilitates the transmission and storage of an electronic record of the purchase to the sales transaction database 106 and that a digital receipt is generated.

The system 100 further includes a mobile electronics device 116 (or mobile device) that is used by an employee of the shopping facility 102. The mobile device 116 is any type of electronic device such as a smartphone, tablet, laptop, or cellular phone that can be used by an employee, for example, at or near the exit of the store. It is generally contemplated that the employee is stationed at or near an exit of the shopping facility 102 and checks to confirm the purchase of merchandise at the shopping facility 102.

The mobile electronics device 116 includes an electronic sensor 118 that is used to electronically scan a paper or digital receipt to obtain the transaction identifier. In one form, it is generally contemplated the employee may scan in information from the device 116 and/or receive information (e.g., alerts). In one form, it is contemplated that the electronic sensor 118 is configured to electronically scan a barcode or QR code on the paper or digital receipt to obtain the transaction identifier. In turn, the transaction identified is used to retrieve the electronic record for the corresponding transaction to determine the merchandise items that were actually purchased. The mobile device 116 also includes a camera 120 that is used to capture one or more images of the merchandise items in the shopping cart 104. In one form, it is contemplated that the camera 120 is used to capture a short video of the merchandise items in the shopping cart 104, and this short video is used to determine the merchandise items that are detected and present in the shopping cart 104.

The employee's mobile device 116 also includes a control circuit 122 that governs the operation of the device 116. In this particular form, it is generally contemplated that the checking and confirming of the purchased merchandise is handled primarily locally via this control circuit 122. As described herein, the language "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 122 may be configured (for example, by using corresponding programming stored in a memory as will be well understood by those skilled in the art) to carry out one or more of the steps, actions, and/or functions described herein.

As shown in FIG. 1, the control circuit 122 is communicatively coupled to a network 124 via which it may access sales transaction database 106. The network 124 may be any type of electronic communication network such as the internet, a wireless network, a wide area network, or a combination of these or other types of networks. It is generally contemplated that the control circuit 122 is coupled to a memory and to a network interface. The memory can, for example, store non-transitorily computer instructions that cause the control circuit 122 to operate as described herein, when the instructions are executed, as is well known in the art. Further, the network interface may enable the control circuit 122 to communicate with other elements (both internal and external to the system 100). This network interface is well understood in the art. The network interface can communicatively couple the control circuit 122 to the network 124 and whatever other networks 124 may be appropriate for the circumstances (and it is contemplated that this network 124 is also coupled to the point-of-sales system 108). The control circuit 122 may be coupled to or in communication with a server of the shopping facility 102 and may make use of cloud databases and/or operate in conjunction with a cloud computing platform.

Figure 2:
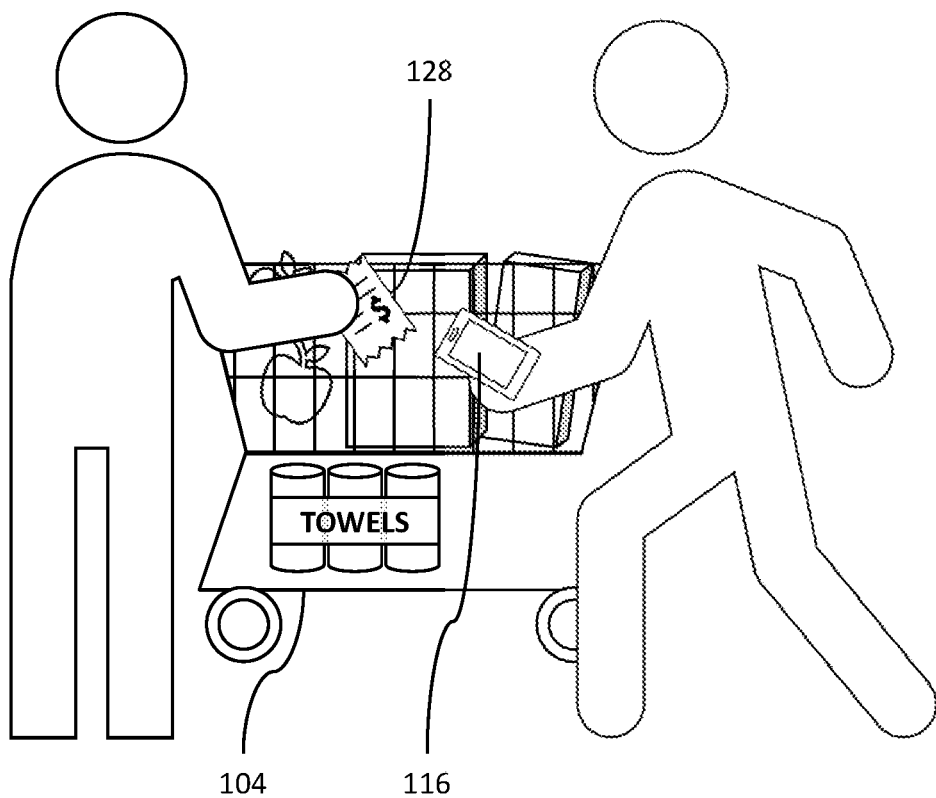
FIG. 2 is a schematic diagram in accordance with some embodiments.

The control circuit 122 receives the transaction identifier from the electronic sensor 118. It is generally contemplated that a store employee uses his or her mobile device 116 to scan the transaction identifier from a paper or digital receipt. For example, as shown in FIG. 2, a store employee is scanning a transaction identifier on a paper receipt 128. The control circuit 122 then accesses the sales transaction database 106 using the transaction identifier to determine the purchased merchandise items.

The control circuit 122 analyzes the image(s) of the merchandise items in the shopping cart 104 using computer vision algorithms and creates a computer vision receipt listing detected merchandise items from the image(s). In one form, the control circuit 122 may analyze the image(s) using one or more convolutional neural networks (CNNs). Various approaches may be used to identify merchandise items in the shopping cart 104. For example, images of known products may be compared to the images of items in the cart 104. In another example, other item identification information (item numbers, shapes, and so forth) may be used to identify a certain product.

Figure 3:
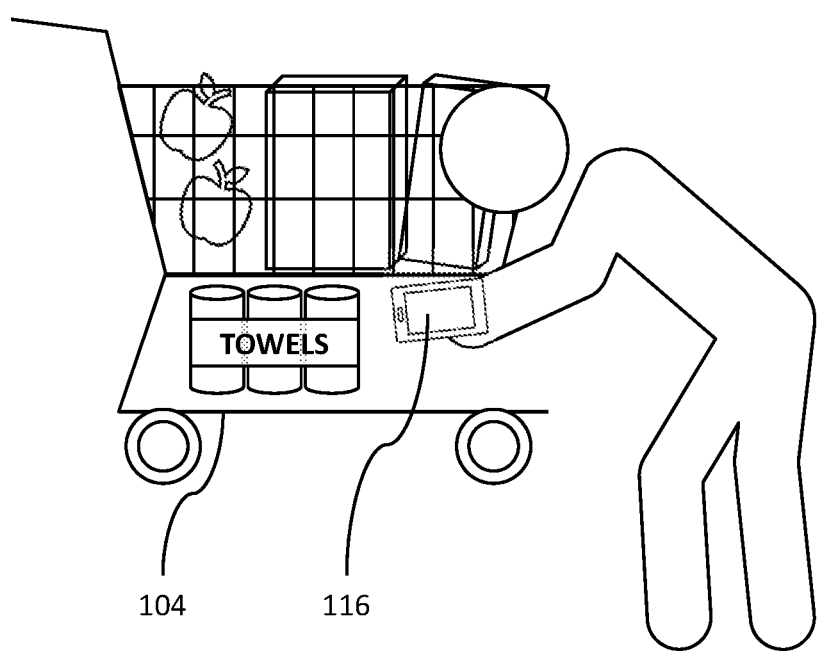
FIG. 3 is a schematic diagram in accordance with some embodiments.

It is generally contemplated that a store employee uses the camera 120 in his or her mobile device 116 capture image(s) (video or still images) of the merchandise items in the shopping cart 104. For example, as shown in FIG. 3, a store employee is capturing image(s) of the merchandise items. It should be understood that the employee actions may be conducted in any order. In other words, the employee may scan the paper or digital receipt before or after capturing image(s) of the merchandise items in the shopping cart 104.

The control circuit 122 compares the purchased merchandise items indicated by the transaction identifier on the paper or digital receipt with the detected merchandise items from the computer vision receipt. When there is a discrepancy between what was purchased and what is detected, an action is taken. The action may be one or more of the following: activating an electronic alert, displaying electronic information on the mobile electronics device 116 showing the discrepancy, activating a warning indicator on the mobile electronics device 116, or transmitting a control signal to instruct an automated vehicle 126 to retrieve an unpaid merchandise item. The system 100 may be configured to select any of these actions, either as a default option under most or all circumstances or as a variable option to be selected depending on changing circumstances. Additional follow up actions may be taken after a discrepancy is determined, such as, for example, completing a sales transaction for any unpurchased items. It is generally contemplated that the discrepancy can be determined and actions taken prior to the customer exiting the shopping facility 102.

Figure 4:
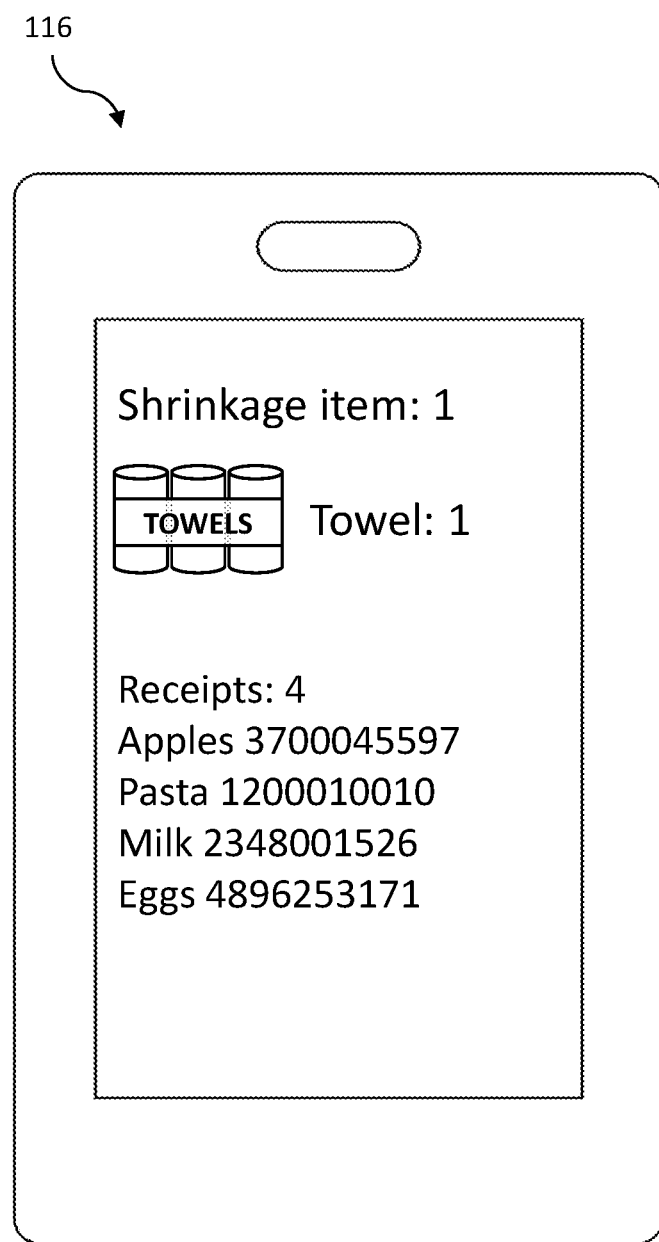
FIG. 4 is a schematic diagram in accordance with some embodiments.

One non-limiting example of an action that can be taken is displaying electronic information on the mobile electronics device 116 showing the discrepancy. For example, as shown in FIG. 4, the display of the employee's mobile device 116 shows a discrepancy between the purchased items and the detected items. More specifically, it shows that one merchandise item (towels) was detected in the shopping cart 104 that was not purchased. The information showing the discrepancy may be in the form of a list of unpaid items and/or may be in the form of images of unpaid items.

Figure 5:
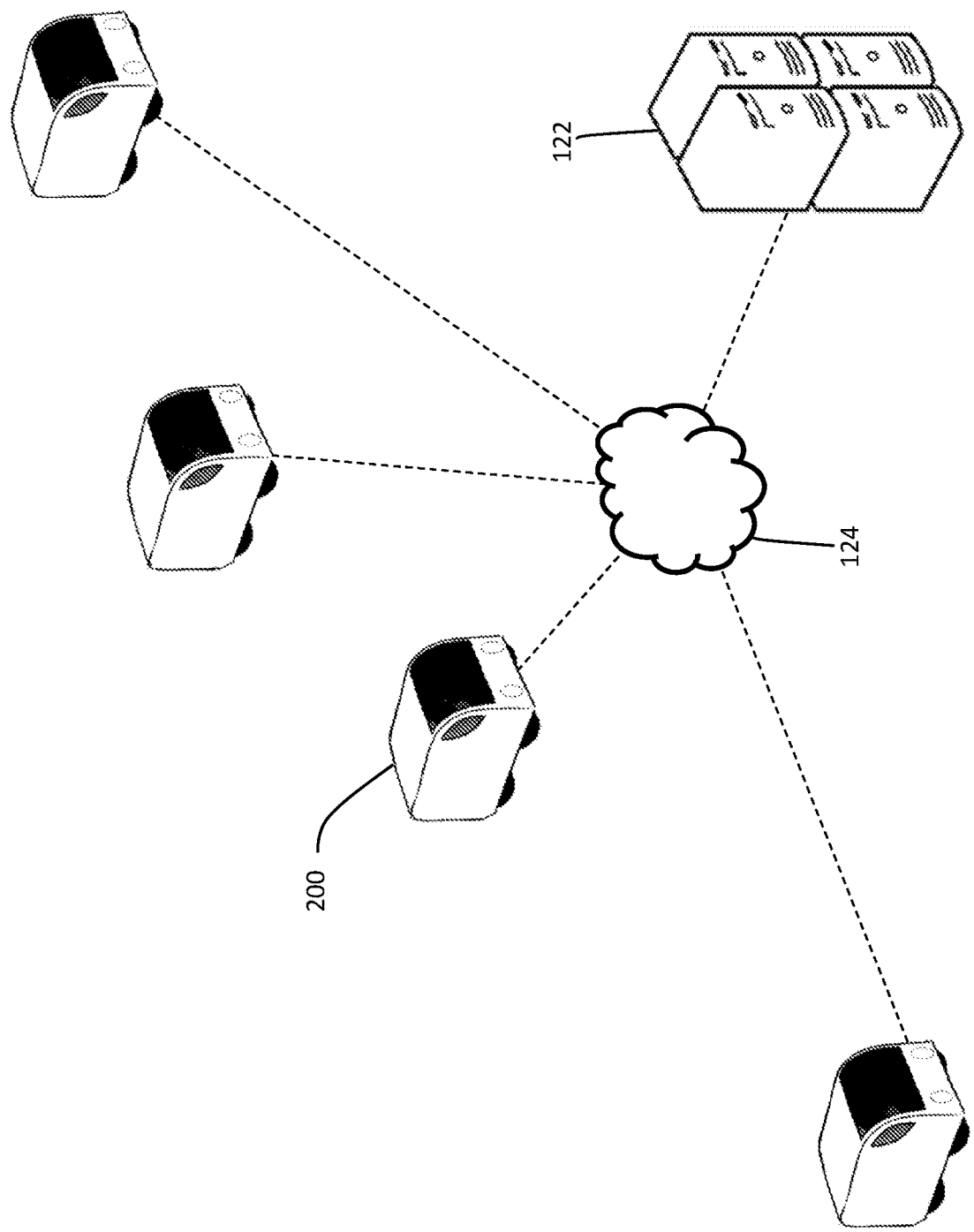
FIG. 5 is a schematic diagram in accordance with some embodiments.
Figure 6:
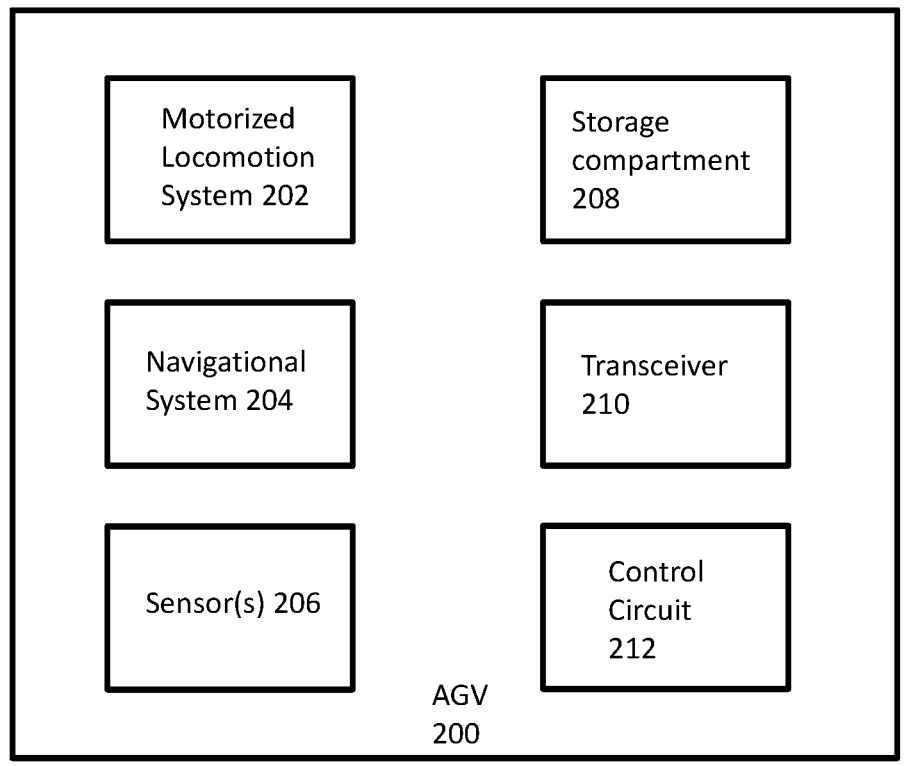
FIG. 6 is a block diagram in accordance with some embodiments.

Another non-limiting example of an action that can be taken is transmitting a control signal to instruct an automated vehicle 126 to retrieve an unpaid merchandise item. The automated vehicle 126 may be in the form of an aerial drone or an autonomous ground vehicle (AGV). In one form, as shown in FIG. 5, the control circuit 122 may communicate with AGV(s) 200 via the network 124. It is generally contemplated that the AGV 200 includes certain components that allow it to convey merchandise. For example, as shown in FIG. 6, the AGV 200 may include a motorized locomotion system 202, a navigational system 204, sensor(s) 206 for determining the AGV's position relative to other objects, a storage compartment 208, a transceiver 210, and an AGV control circuit 212.

In this example, the AGV 200 includes a motorized locomotion system 202 configured to facilitate movement of the AGV 200. It is generally contemplated that the motorized locomotion system 202 may include wheels (or tracks or legs), a motor, and a drive mechanism. The AGVs 200 each include a power source (such as a battery or solar cell) disposed in the vehicle body to energize its motorized locomotion system 202 and other components. The motorized locomotion system 202 may comprise one or more motors that control one or more of a speed, direction, and/or orientation of one or more wheels (or tracks or legs) on the AGV 200. The motorized locomotion system 202 may be configured to be controlled by the AGV control circuit 212 to move the AGV 200 in designated directions.

The AGV 200 includes a navigational system 204 for guiding the AGV 200 along its path. The navigational system 204 includes sensor(s) for navigation and optionally for detecting obstacles in the AGV's path as it travels along its route. These sensor(s) may be of any of various types, including compasses and other navigational aids, gyroscopes, magnetometers, accelerometers, radar laser range finders, ultrasound range finders, infrared sensors, and optical/imaging sensors (such as video/camera devices). It is also generally contemplated that the optical/imaging sensors may permit a human operator to remotely guide the AGV 200. As part of and in addition to the navigational sensors, the AGV 200 also includes sensor(s) 206 for determining the AGV's position relative to other objects. These sensor(s) 206 aid in the avoidance of objects as the AGV 200 travels about the shopping facility 102.

In some embodiments, the AGV 200 may also include a storage compartment 208 and may be configured to carry various types of merchandise items and other cargo. The AGV 200 further includes a transceiver 210 configured for wireless communication (such as the examples of transceivers described above), possibly with control circuit 122. In addition, the AGV 200 includes an AGV control circuit 212 operatively coupled to the motorized locomotion system 202, the navigational system 204, the sensor(s) 206, and the transceiver 210. The AGV control circuit 212 is configured to operate and move the AGV 200. The AGV control circuit 212 may comprise a processor, a microprocessor, and the like and may be configured to execute computer readable instructions stored on a computer readable storage memory (such as the mobile device control circuit 122 described above).

Figure 7:
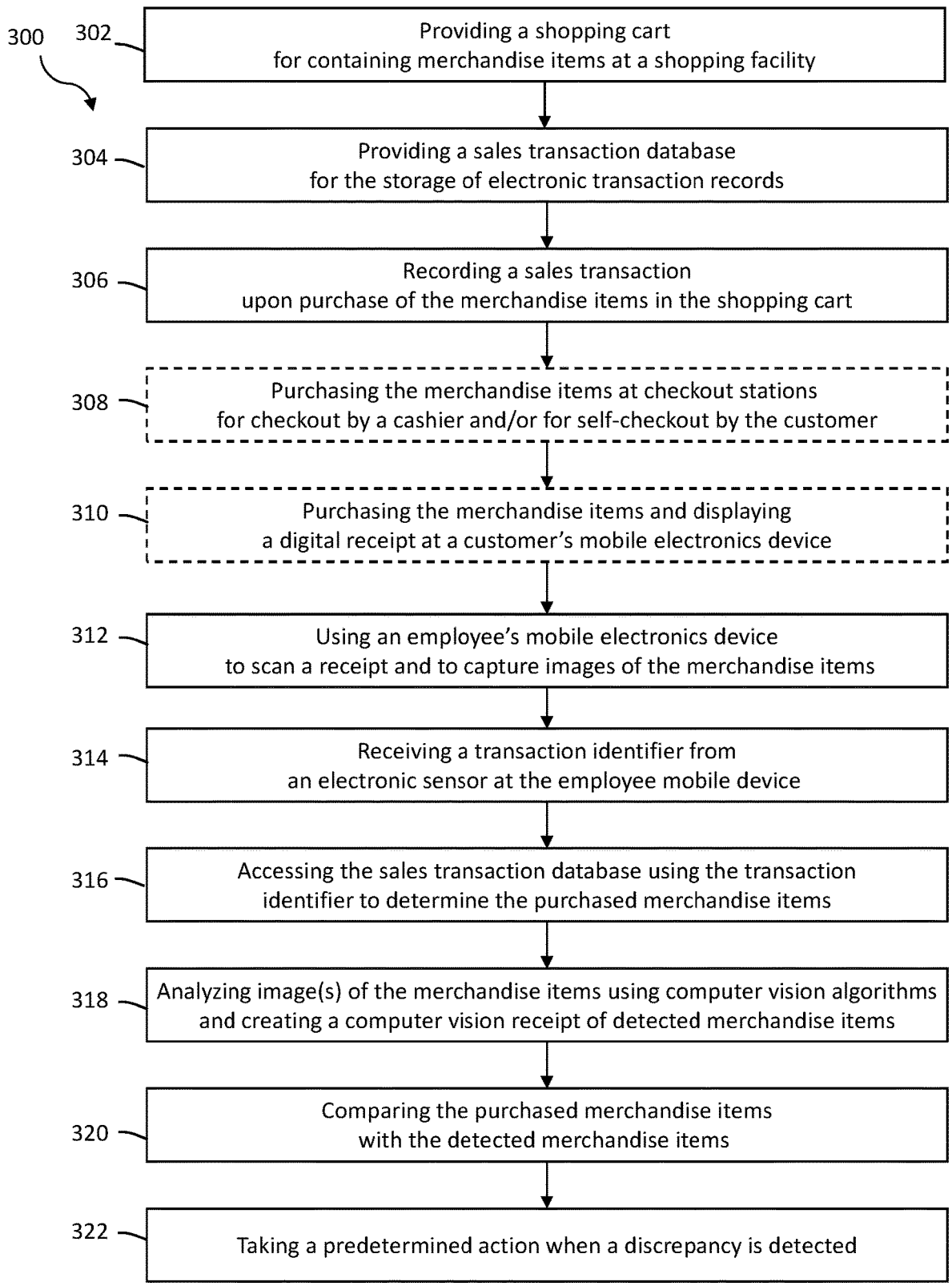
FIG. 7 is a flow diagram in accordance with some embodiments.

Referring to FIG. 7, there is shown a process 300 for checking and confirming purchased merchandise items at shopping facilities. It is generally contemplated that an employee is stationed at or near an exit of a shopping facility to check and confirm merchandise items in a shopping cart. In this form, it is contemplated that the checking/confirming is performed locally at the employee's mobile device. The process 300 may use some or all of the components of the system 100 described above.

At block 302, a shopping cart is provided at a shopping facility for holding merchandise items. It is generally contemplated that the cart will hold merchandise items that are intended for purchase and that are subsequently checked and confirmed by an employee's mobile electronics device, such as at the store exit. At block 304, a sales transaction database is provided for the storage of electronic transaction records involving the sales of merchandise items at the shopping facility. It is generally contemplated that the sales transactions may be performed in a few different ways but that each sales transaction is stored in the database (which may be located locally, such as at the store, or may be located remotely, such as a cloud database).

At block 306, a sales transaction is recorded upon purchase of the merchandise items in the shopping cart. It is generally contemplated that a point-of-sales system records a sales transaction of a customer as the customer purchases the merchandise items in the shopping cart at the shopping facility and obtains a transaction identifier. The customer obtains a paper or digital receipt of the transaction including the transaction identifier, and the point-of-sales system creates an electronic transaction record identified by the transaction identifier that is stored in the sales transaction database. Additional transaction information may also be stored, including, for example, the time of the transaction (such as a timestamp).

Blocks 308 and 310 show several different ways in which a customer's purchase may be processed. At block 308, the merchandise items are purchased at checkout stations for checkout by a cashier and/or for self-checkout by the customer. In other words, checkout is either handled by a cashier or by the customer himself at a checkout station with a point-of-sale device. In contrast, at block 310, the merchandise items are purchased by the customer using the customer's mobile electronics device without using a checkout station. In this form, the customer handles the purchase using his or her mobile device, and a digital receipt is displayed at a customer's mobile electronics device. In this form, it is generally contemplated that the customer has downloaded an app from the retailer to facilitate purchase in this manner. Further, the digital receipt may be in the form of a barcode or QR code and include the transaction identifier.

At block 312, an employee's mobile electronics device is used to scan a receipt and to capture images of the merchandise items. These two actions may be performed in either order. The receipt may be a paper receipt that may be generated at a checkout station, or it may be a digital receipt that may be generated at a customer's mobile electronics device. It is generally contemplated that the receipt will include a transaction identifier corresponding to the purchased items, which is scanned by a sensor on the employee's mobile electronics device. The device also includes a camera used to capture images of the merchandise items in the shopping cart, such as a short video or still images. The mobile electronics device uses computer vision algorithms to generate a CV receipt of merchandise items detected in the shopping cart.

At block 314, a transaction identifier is received from an electronic sensor at the employee mobile electronics device. In other words, the employee has scanned the transaction identifier on the customer's paper or digital receipt. At block 316, the sales transaction database is accessed using the transaction identifier to determine the purchased merchandise items. The employee's mobile electronics device accesses the electronic transaction record corresponding to the transaction identifier (to determine the merchandise items that were actually purchased).

At block 318, the image(s) of the merchandise items are analyzed using computer vision algorithms and a computer vision (CV) receipt of detected merchandise items is created. In other words, a second receipt is created of the items detected and present in the customer's shopping cart (such as at or near the exit of the store). At block 320, the purchased merchandise items are compared with the detected merchandise items. In other words, the purchased items indicated by the customer's paper or digital receipt are compared to the detected items indicated by the CV receipt.

At block 322, if a discrepancy is determined, certain action is taken. The action is one or more of the following: activating an electronic alert, displaying electronic information on the mobile electronics device showing the discrepancy, activating a warning indicator on the mobile electronics device, or transmitting a control signal to instruct an automated vehicle to retrieve an unpaid merchandise item. A default action may be selected to be performed generally, such as displaying electronic information on the mobile electronics device showing the discrepancy. Alternatively, different actions may be selected to be performed depending on different circumstances.

Figure 8:
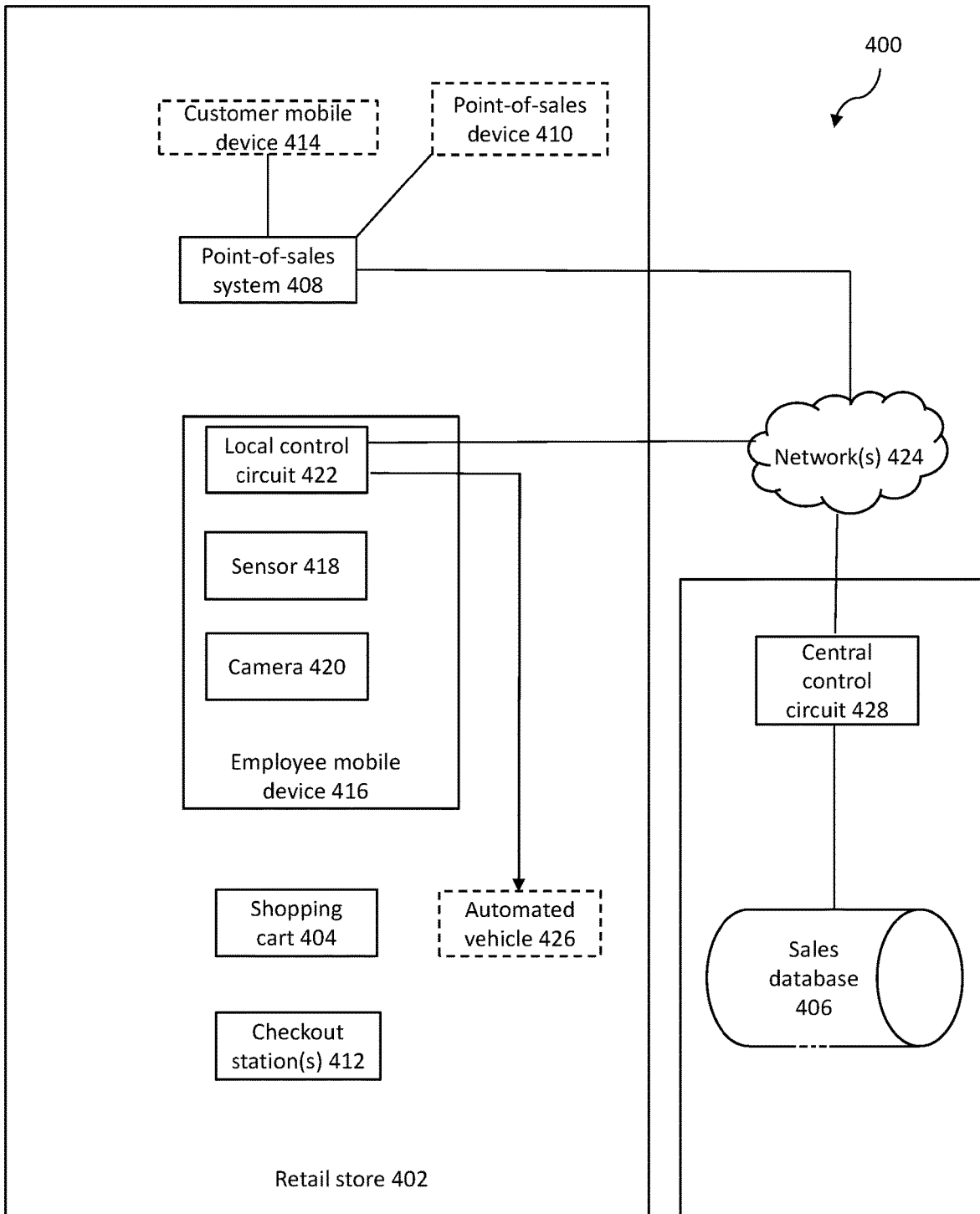
FIG. 8 is a block diagram in accordance with some embodiments.

FIG. 8 shows a system 400 that is similar to system 100 but certain processing is not handled locally at the employee's mobile electronics device. More specifically, in this form, the system 400 checks for unpaid merchandise items at or near the exit using a mobile device of an employee that scans a paper or digital receipt, that captures images of the items in the shopping cart, and that uses computer vision to generate a CV receipt of items. However, in system 400, the transaction identifier and CV receipt are transmitted to a central control circuit (separate from the local control circuit of the employee's mobile electronics device) for comparison, and any discrepancy is then transmitted back to the mobile device.

As can be seen in FIG. 8, many of the components are similar to those described above with respect to system 100. The system 400 includes a shopping cart 404 for merchandise items to be purchased by customers at a shopping facility 402, a sales transaction database 406 for storing electronic transaction records, a point-of-sales system 408 that records sales transactions and obtains a transaction identifier for each transaction, and a mobile electronics device 416 for use by an employee that includes an electronic sensor 418 (for scanning paper/digital receipts) and a camera 420 (for capturing images of items in the shopping cart 404). Purchase transactions may be accomplished via point-of sales devices 410 at checkout stations 412 (cashier checkout or customer self-checkout) and/or via customer mobile devices (such as using an app provided by a retailer and downloaded by the customer).

In this form, however, it is contemplated that the system 400 includes a local control circuit 422 (at the employee's mobile electronics device 416) and a central control circuit 428 (that is separate from the mobile device 416). The central control circuit 428 may be located at the shopping facility 402, or it may be located more remotely, such as at a cloud-based computing platform. In this form, the local control circuit 422 receives the transaction identifier from the electronic sensor 418, analyzes the image(s) of the merchandise items in the shopping cart using computer vision algorithms and creates a computer vision receipt listing detected merchandise items, and transmits the transaction identifier and the CV receipt. Further, in this form, the central control circuit 428 accesses the sales transaction database 406 using the transaction identifier to determine the purchased merchandise items; compares the purchased merchandise items indicated by the transaction identifier with the detected merchandise items from the computer vision receipt; and when there is a discrepancy, determines an action to take. This action may be one of the following: activating an electronic alert, transmitting electronic information to the mobile electronics device 416 showing the discrepancy, activating a warning indicator, or transmitting a control signal to instruct an automated vehicle 426 to retrieve an unpaid merchandise item.

Figure 9:
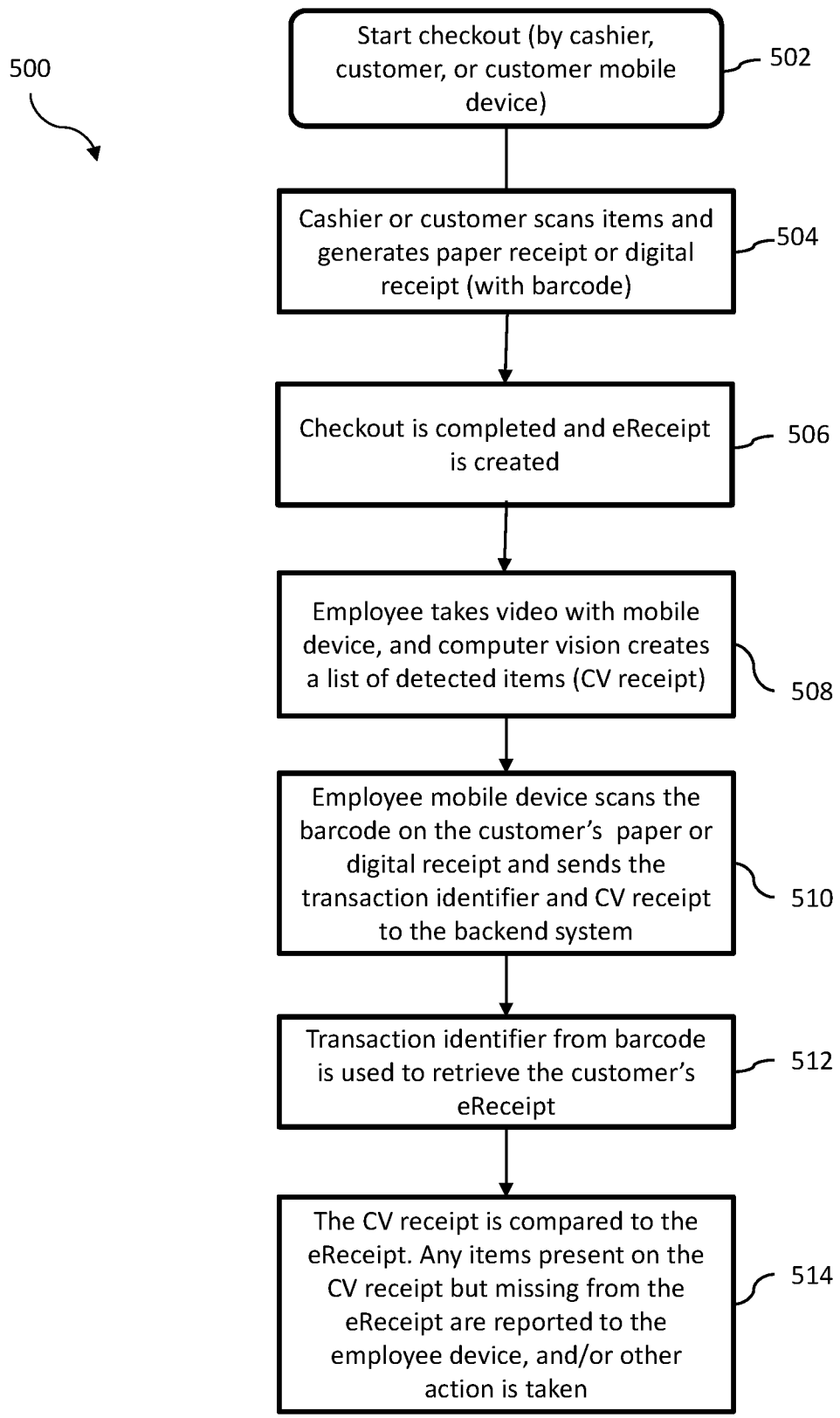
FIG. 9 is a flow diagram in accordance with some embodiments.

FIG. 9 shows another example of a process 500 for checking and confirming the purchase of merchandise items at a shopping facility. At block 502, checkout is started. This step refers broadly to any of various ways that a sales transaction may be handled at the shopping facility. For example, checkout may be handled by a store cashier, self-checkout may be handled by the customer himself at a self-checkout station, or checkout may be handled by the customer scanning of merchandise items using the customer's mobile device.

At block 504, the cashier or customer scans the merchandise items and generates a paper receipt or a digital receipt. For example, a digital receipt may be generated where checkout is be handled by the customer scanning of merchandise items using the customer's mobile device. In this form, the paper receipt or digital receipt includes a barcode or QR code with a transaction identifier.

At block 506, checkout is completed, and an eReceipt (or electronic receipt) is created. The electronic receipt of the actual transaction (with all the items purchased and their quantities) is created as a transaction record. An electronic receipt with the transaction identifier is created, and the eReceipt includes the merchandise items that were paid for by the customer. It is generally contemplated that the paper or digital receipt may be shown to an employee of the store as the customer leaves the store.

At block 508, the employee takes video with his or her mobile device, and computer vision creates a list of detected items (CV receipt). In one form, computer vision software is used to create a list of the detected items (e.g., in the form of a CV profile or receipt). In some forms, the CV profile may include transaction time information (e.g., when the transaction occurred such as a timestamp).

At block 510, the employee mobile device scans the barcode on the customer's paper or digital receipt and transmits the transaction identifier and CV receipt to the backend system. This backend system corresponds to the central control circuit, which is remote from the employee's mobile device. This backend system may be located at the shopping facility or may be located in an off-site cloud-based computing platform.

At block 512, at the backend system, the transaction identifier from the barcode is used to retrieve the customer's eReceipt. At block 514, the detected items form the CV receipt are compared to the purchased items from the eReceipt. Any items present on the CV receipt but missing from the eReceipt are reported to the employee's mobile device, and/or other action is taken.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for checking and confirming the purchase of merchandise at shopping facilities, the system comprising:
a shopping cart containing a plurality of merchandise items that are to be purchased by a customer at a shopping facility;
a sales transaction database configured to store electronic transaction records involving the sales of one or more merchandise items at the shopping facility;
a point-of-sales system that records a sales transaction of the plurality of merchandise items and that generates a barcode or QR code on a paper or digital receipt corresponding to the sales transaction, the point-of-sales system creating an electronic transaction record identified by the barcode or QR code, the electronic transaction record being stored in the sales transaction database;
a mobile electronics device comprising:
a barcode or QR code scanner; and
a camera configured to capture an image sequence of the merchandise items in the shopping cart;
a control circuit at the mobile electronics device configured to:
receive the barcode or QR code;
access the sales transaction database using the barcode or QR code to determine the purchased merchandise items;
analyze the image sequence of the merchandise items in the shopping cart using a computer vision algorithm to identify the merchandise items based on the image sequence and create a computer vision receipt listing the merchandise items identified from the image sequence;
compare the purchased merchandise items indicated by the barcode or QR code on the paper or digital receipt with the identified merchandise items from the computer vision receipt, and determine a discrepancy; and
cause to display on the mobile electronics device the discrepancy, the display including one or both of a list of unpaid items or images of unpaid items; and
an automated vehicle configured to receive a control signal for retrieving an unpaid merchandise item.

2. The system of claim 1, wherein the control circuit analyzes the image sequence using one or more convolutional neural networks (CNNs).

3. The system of claim 1, further comprising one or more checkout stations in the shopping facility, the one or more checkout stations configured for at least one of checkout by a cashier and self-checkout by the customer, the point-of-sales system comprising a point-of-sales device being located at the one or more checkout stations.

4. The system of claim 1, further comprising:
a mobile electronics device of the customer used to purchase the merchandise items and configured to display a digital receipt at the mobile electronics device following purchase of the merchandise items.

5. The system of claim 4, further comprising an application provided by a retailer and downloaded by the customer to the customer's mobile electronics device for purchase of merchandise at shopping facilities using the customer's mobile electronics device.

6. A method for checking and confirming the purchase of merchandise at shopping facilities, the method comprising:
providing a shopping cart, the shopping cart containing a plurality of merchandise items that are to be purchased by a customer at a shopping facility;
providing a sales transaction database configured to store electronic transaction records involving the sales of one or more merchandise items at the shopping facility;
providing a point-of-sales system that records a sales transaction of the plurality of merchandise items and that generates a barcode or QR code on a paper or digital receipt corresponding to the sales transaction, the point-of-sales system creating an electronic transaction record identified by the barcode or QR code, the electronic transaction record being stored in the sales transaction database;
providing a mobile electronics device including a barcode or QR code scanner and a camera configured to capture an image sequence of the merchandise items in the shopping cart;
by a control circuit at the mobile electronics device:
receiving the barcode or QR code;
accessing the sales transaction database using the barcode or QR code to determine the purchased merchandise items;
analyzing the image sequence of the merchandise items in the shopping cart using a computer vision algorithm to identify the merchandise items based on the image sequence and create a computer vision receipt listing the merchandise items identified from the image sequence;
comparing the purchased merchandise items indicated by the barcode or QR code on the paper or digital receipt with the identified merchandise items from the computer vision receipt, and determine a discrepancy; and
causing to display on the mobile electronics device the discrepancy, the display including one or both of a list of unpaid items or images of unpaid items; and
receiving, by an automated vehicle, a control signal for retrieving an unpaid merchandise item.

7. The method of claim 6, wherein the control circuit analyzes the image sequence using one or more convolutional neural networks (CNNs).

8. The method of claim 6, further comprising providing one or more checkout stations in the shopping facility, the one or more checkout stations configured for at least one of checkout by a cashier and self-checkout by the customer, the point-of-sales system comprising a point-of-sales device being located at the one or more checkout stations.

9. The method of claim 6, further comprising:
by a mobile electronics device of the customer, purchasing the merchandise items and displaying a digital receipt at the mobile electronics device following purchase of the merchandise items.

10. The method of claim 9, further comprising providing an application for download by the customer to the customer's mobile electronics device for purchase of merchandise at shopping facilities using the customer's mobile electronics device.

11. A system for checking and confirming the purchase of merchandise at shopping facilities, the system comprising:
a shopping cart containing a plurality of merchandise items that are to be purchased by a customer at a shopping facility;
a sales transaction database configured to store electronic transaction records involving the sales of one or more merchandise items at the shopping facility;
a point-of-sales system that records a sales transaction of the plurality of merchandise items and that generates a barcode or QR code on a paper or digital receipt corresponding to the sales transaction, the point-of-sales system creating an electronic transaction record identified by the barcode or QR code, the electronic transaction record being stored in the sales transaction database;
a mobile electronics device comprising:
a barcode or QR code scanner;
a camera configured to capture an image sequence of the merchandise items in the shopping cart; and
a local control circuit configured to:
receive the barcode or QR code;
analyze the image sequence of the merchandise items in the shopping cart using a computer vision algorithm to identify the merchandise items based on the image sequence and create a computer vision receipt listing the merchandise items identified from the image sequence;
transmit the barcode or QR code and the computer vision receipt;
a central control circuit configured to:
access the sales transaction database using the barcode or QR code to determine the purchased merchandise items;
compare the purchased merchandise items indicated by the barcode or QR code on the paper or digital receipt with the identified merchandise items from the computer vision receipt, and determine a discrepancy; and
cause to display on the mobile electronics device the discrepancy, the display including one or both of a list of unpaid items or images of unpaid items; and
an automated vehicle configured to receive a control signal for retrieving an unpaid merchandise item.

12. The system of claim 11, further comprising one or more checkout stations in the shopping facility, the one or more checkout stations configured for at least one of checkout by a cashier and self-checkout by the customer, the point-of-sales system comprising a point-of-sales device being located at the one or more checkout stations.

13. The system of claim 11, further comprising:
a mobile electronics device of the customer used to purchase the merchandise items and configured to display a digital receipt at the mobile electronics device following purchase of the merchandise items.

14. The system of claim 1, wherein:
analyzing the image sequence of the merchandise items in the shopping cart comprises comparing images of known products to the image sequence of the merchandise items in the shopping cart.

15. The system of claim 1, wherein:
analyzing the image sequence of the merchandise items in the shopping cart comprises using identification information on each merchandise item including at least one of numbers and shapes to identify the merchandise item.

16. The system of claim 1, wherein the automated vehicle is configured to retrieve the unpaid merchandise item based on the control signal.

17. The system of claim 1, wherein the automated vehicle is an aerial drone or an automated ground vehicle.

\* \* \* \* \*